United States Patent [19]

Suri et al.

[11] Patent Number: 5,611,923
[45] Date of Patent: Mar. 18, 1997

[54] FILTER ASSEMBLY HAVING QUICK CONNECT/DISCONNECT SEALING VALVE MEANS

[75] Inventors: Kanwar Suri; Z. Paul Akian, both of Los Angeles, Calif.; Steven H. Parker; Robert F. Udell, both of Grand Rapids, Mich.; Michael M. Leitzell, Holland, Mich.; David K. Nees, Toledo, Ohio; S. Glenn McLean, Albemarle, N.C.

[73] Assignee: Vickers, Inc., Maumee, Ohio

[21] Appl. No.: 501,517

[22] Filed: Jul. 12, 1995

[51] Int. Cl.⁶ .......................... B01D 27/08; B01D 27/10; B01D 35/153

[52] U.S. Cl. .......................... 210/238; 210/133; 210/136; 210/232; 210/444; 55/356; 55/490; 137/549; 137/614.03; 137/614.05; 285/305; 285/308; 285/316; 285/921; 251/149.6

[58] Field of Search .......................... 210/234, 235, 210/232, 238, 136, 133, 444; 55/356, 490; 137/549, 614.03, 614.05; 285/305, 308, 316, 921; 251/149.6

[56] References Cited

U.S. PATENT DOCUMENTS

| | | |
|---|---|---|
| 2,793,752 | 5/1957 | Jay . |
| 2,854,259 | 9/1958 | Clark . |
| 3,399,776 | 9/1968 | Knuth . |
| 3,519,133 | 7/1970 | Broering . |
| 3,530,887 | 9/1970 | Stratman . |
| 3,554,242 | 1/1971 | Cleghorn et al. ........................ 140/107 |
| 3,910,307 | 10/1975 | Jankowski . |
| 4,559,136 | 12/1985 | Dockery . |
| 4,707,262 | 11/1987 | Murken . |
| 4,767,530 | 8/1988 | Gilliam et al. ........................... 210/232 |
| 4,892,117 | 1/1990 | Spalink et al. ........................ 137/614.03 |
| 4,894,156 | 1/1990 | Murken . |
| 5,024,760 | 6/1991 | Kemper ................................... 210/232 |
| 5,024,761 | 6/1991 | Deibel . |
| 5,076,918 | 12/1991 | Foust et al. .............................. 210/238 |
| 5,108,598 | 4/1992 | Posner . |
| 5,139,049 | 8/1992 | Jensen et al. ......................... 137/614.05 |
| 5,139,658 | 8/1992 | Hodge ....................................... 210/167 |
| 5,178,753 | 1/1993 | Trabold ................................... 210/130 |
| 5,182,015 | 1/1993 | Lee ............................................. 210/94 |
| 5,226,682 | 7/1993 | Marrison et al. ........................ 285/308 |
| 5,228,990 | 7/1993 | Chiang .................................... 210/223 |
| 5,230,795 | 7/1993 | Yang ....................................... 210/236 |
| 5,248,168 | 9/1993 | Chichester et al. . |
| 5,300,223 | 4/1994 | Wright ................................... 210/232 |
| 5,328,606 | 7/1994 | Warren et al. ......................... 210/238 |

FOREIGN PATENT DOCUMENTS 1566502  4/1980  United Kingdom .

*Primary Examiner*—Thomas M. Lithgow
*Attorney, Agent, or Firm*—Emch, Schaffer, Schaub & Porcello Co., L.P.A.

[57] ABSTRACT

A filter assembly has a housing for supporting a filter element, a first quick connect sealing valve operatively connected to an inlet passageway in the housing, and a second quick connect sealing valve operatively connected to an outlet passageway in the housing.

12 Claims, 1 Drawing Sheet

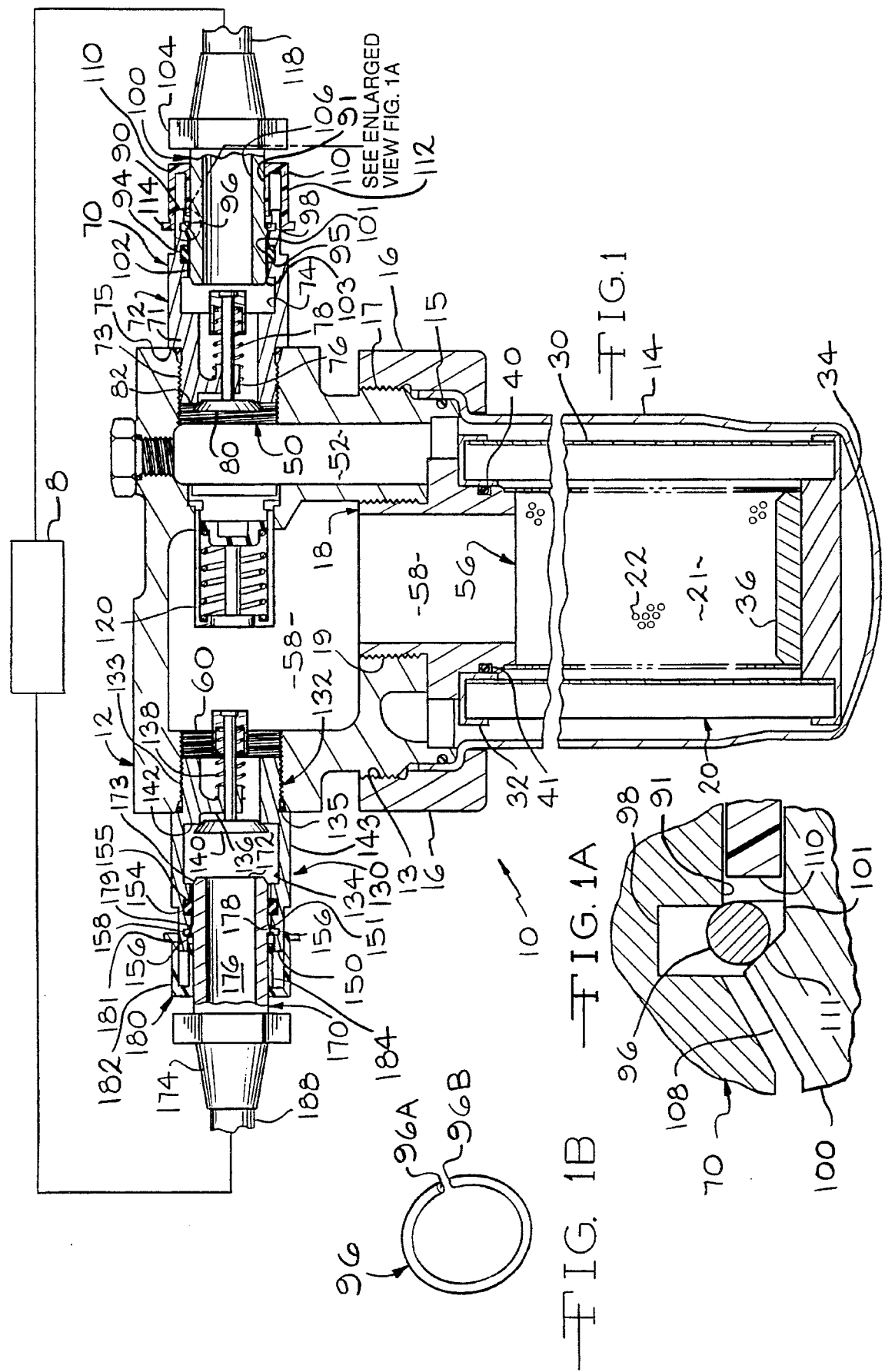

FILTER ASSEMBLY HAVING QUICK CONNECT/DISCONNECT SEALING VALVE MEANS

TECHNICAL FIELD

The filtration system of the present invention has a quick change capability and also has low environmental impact. The filter assembly has integral check valves within the filter housing of the filter assembly such that hoses leading to and from the filter assembly can be readily connected and disconnected,

BACKGROUND OF THE INVENTION

Fluid filtration systems are typically used in such fluid circulating systems as hydraulic, lubrication, and water systems. The filtration systems primarily comprise a reservoir for the fluid, a pump device to pump the fluid out from the reservoir under pressure and at least one filter assembly. The fluid is continually filtered through a suitable filtration medium to remove unwanted residues or impurities. For example, liquid filtration systems used for filtering the lubricating oil of an internal combustion engine generally have a filter assembly which contains a replaceable filter element comprising a suitable filtration medium. The oil enters the filter assembly through an inlet, passes through the filtration medium and exits through an outlet back into the engine/reservoir.

Those familiar with the filter industry know that when a used filter element is to be removed from the filter assembly, often the space for maneuvering and handling the filter element is limited such that the filter element cannot be easily removed or replaced. Often there is limited space and additional tools such as rachet wrenches are required to remove the filter assembly from the fluid circulation system. When the filter assembly is replaced on the fluid circulation system, this procedure is repeated.

The filter assemblies have connecting inlet and outlet pipes or tubes leading to and from the filter assembly and connecting the filter assembly to the fluid circulation system. It is necessary to achieve fluid-tight seals between the pipes or tubes and the filter assembly. Problems arise, however, and messy fluid spills occur when the filter assembly is disconnected from the fluid circulation system. Fluids remaining in the filter assembly and in the connecting tubes tend to leak or spill from the filter assembly and tubes.

Accordingly, it is an object of the present invention to provide a filter assembly which mitigates or eliminates the above problems encountered with conventional fluid filter systems.

Another object of the present invention is to provide a filter assembly having quick connect devices wherein upon release of the connecting devices, fluid flow into or out of the filter assembly is stopped, thereby minimizing the likelihood of leakage of fluid from the filter assembly during replacement of a filter element.

DESCRIPTION OF THE INVENTION

According to one aspect of the present invention, the filter assembly is easy to connect to and disconnect from a fluid circulation system. No tools are required and very little installation time is required. The filter assembly of the present invention is easy to service. No leaks or spillage occurs when disconnecting the filter assembly from the hoses or pipes connected thereto. The filter assembly of the present invention includes at least one self-sealing inlet valve and at least one self-sealing outlet valve which immediately stop the flow of fluid into or out of the filter assembly when the self-sealing valve means are disconnected.

The quick connect inlet and outlet sealing valve each comprise a valve portion defining an annular passageway therein which receives a locking portion. The valve portion has a seat which is axially moveable between open and closed positions. The seat is biased to a closed position when there is no fluid pressure against the seat. The locking portion defines an annular passageway which is in communication with the passageway in the valve portion. The locking portion further defines a locking means and an unlocking means. In a preferred embodiment the locking means comprises a detent or cam surface on an exterior surface of the locking portion. The locking means comes into mating contact with an engaging means in the annular passageway in the valve portion during movement between the connect and disconnect positions. In a preferred embodiment, the engaging means comprises an annular engaging member or ring which is disposed in an annular recess within the passageway of the valve portion.

During connection of the filter assembly to a fluid circulation system one end of the locking portion is operatively connected to a fluid inlet tube while the valve portion is operatively connected to, or in other embodiments is integrally formed with, the filter assembly. The other end of the locking portion is axially moved within the annular passageway of the valve portion and contacts the engaging member. Continued forward movement of the mating locking portion causes the locking means to contact the engaging means and to force the engaging means into the annular recess. In a preferred embodiment the engaging means is forced into the recess by a leading side of the cam surface on the exterior surface of the locking portion. Further continued axial movement of the locking means allows the cam surface to slidably move past the engaging member such that the engaging member is partially displaced from the recess in the valve portion. The engaging member is in contact with a trailing side of the cam surface such that the locking portion cannot be slideably removed from the valve portion without moving the unlocking means on the locking portion.

In a preferred embodiment, the unlocking means comprises a collar coaxially extending around the exterior surface of the locking portion. In order to disconnect the valve portion the collar, which extends in a direction toward the valve portion, is moved in a direction toward the valve portion. The collar contacts the engaging member and again forces the engaging member into the recess in the valve portion. Simultaneously, the locking portion is moved axially in a direction away from the valve portion such that the locking portion can be axially removed from the valve portion.

Therefore, it is an object of the present invention to provide a filter assembly which provides a quick connect/ disconnect means for preventing leakage or spills from the filter assembly during connecting and disconnecting of the filter assembly from a fluid circulation system.

It is a further object of the present invention to provide a filter assembly which minimizes any down time of a filtration system.

It is further object of the present invention to provide a filter assembly which keeps contaminants from entering a hydraulic/lubrication/water system during any filter assembly change process,

BRIEF DESCRIPTION OF THE DRAWINGS

FIG. 1 is a side elevational, cross-sectional view of a liquid filter assembly.

FIG. 1A is an enlarged view of the area shown in FIG. 1.

FIG. 1B is a perspective view of an engaging means of a valve portion of a filter assembly.

BEST MODE OF CARRYING OUT THE INVENTION

Referring to the drawings and particularly to FIG. 1, a filter assembly 10 generally comprises a filter mount or housing 12 is operatively connected to a fluid circulation system 8. A bowl 14 is operatively connected to the housing 12 by a holder 16 which incorporates threads on an interior surface 13 of the holder 16. The holder 16 threadingly engages an exterior surface 17 of the housing 12. The holder 16 is sealingly engaged to the housing 12 by a sealing means 15 such as an O-ring. A filter support means or a nipple member 18 is threadingly engaged to or pressed into an interior surface 19 of the housing 12.

In the embodiment shown in FIG. 1, the nipple member 18 is matingly engaged with a conventional filter element 20 which extends axially into the bowl 14. The filter element 20 comprises a support tube 21 having a plurality of openings 22 extending radially therethrough and filtration media 30 comprising a plurality of layers of pleated materials axially extending around the support tube 21. The filter element 20 also comprises a first or open end cap 32 and a second or closed end cap 34 which is in an opposed relationship to the first end cap 32. The end caps 32 and 34 secure the filtration media 30 against the support tube 21 of the filter element 20. The first end cap 32 matingly engages a sealing ring 40 which is positioned within an annularly extending groove or detent 41 in the nipple member 18. The filter element 20 also has a base portion 36 adjacent the second end cap 34 which further seals the filter element 20. It is to be understood that various configurations of filter elements are useful with the present invention.

In the embodiment shown, the housing 12 defines an inlet passageway 50 which is in communication with an annular passageway 52 in the housing 12. The passageway 52 is in communication with the bowl 14 such that fluid flows from the passageway 50 through passageway 52 into bowl 14. The fluid then passes through the filtration media 30 and through the openings 22 in the support tube 21 of the filter element 20. The support tube 21 defines a passageway 56 which is in communication with at least one further passageway 58 in the housing 12. The annular passageway 58 is in communication with an outlet passageway 60.

In the embodiment shown, the inlet passageway 50 is adapted to receive a quick connect/disconnect sealing valve means 70. The present invention of providing a filter assembly with quick connect/disconnect means for easily removing the filter assembly from its neighboring fluid circulation system parts has not been known previously. Therefore, it is within the contemplated scope of the present invention that suitable quick connect/disconnect means which prevent the flow of fluid upon being disconnected are useful in the present invention. For ease of illustration, one embodiment of a quick connect sealing valve means is shown in detail herein. It should be further understood that the valve portions of the sealing valve means can be integrally formed as part of the housing of the filter in certain embodiments. However, for ease of illustration, the sealing valve means are shown herein to be removably engageable with the housing of the filter.

The quick connect/disconnect sealing valve means 70 comprises a valve portion 72 and a locking portion 100. In the embodiment shown, the passageway 50 is threaded to coaxially receive the threaded valve portion 72 of the quick connect sealing valve means 70. An O-ring or sealing ring 75 circumferentially engages an outer surface 71 of the valve portion 72 and seals the quick connect valve means 70 to the housing 12. The valve portion 72 has a first end 73 and a second end 90 which define at least one passageway 74. The first end 73 is threaded such that the first end 73 is threadingly engaged in the inlet passageway 50 in the housing 12. The passageway 74 defines an interior diameter (i.e., has an interior volume) such that fluid flowing through the quick connect sealing valve means 70 does not experience a drop in pressure between passage from the passageway 74 into the passageway 52 in the housing 12.

The valve portion 72 has a support means 76 extending radially inwardly in the passageway 74 for supporting a compression spring means 78 located axially within the passageway 74. The compression spring 78 is operatively connected to a valve popper or seat 80. The valve seat 80 is axially movable between open and closed positions and is biased to a closed position by the spring 78. The valve seat 80 sealingly engages against a valve body 82 of the valve portion 72. The compression spring 78 ensures that the valve seat 80 engages the valve body 82 in a fluid-tight manner when no fluid is flowing through the passageway 74.

The second end 90 of the valve portion 72 is in a spaced apart relationship to the first end 73. In certain embodiments, the second end 90 defines a first annular recess 95 which is circumferentially disposed within an interior surface 91 of the passageway 74. At least one O-ring or sealing means 94 is annularly disposed in the annular recess 95 to aid in sealing the locking portion 100 to the valve portion 70, as will be described in detail below.

The second end 90 of the valve portion 72 defines a second annular recess 98 which is circumferentially disposed within the interior surface 91 of the passageway 74. At least one engaging member 96 is annularly disposed in the annular recess 98 in the passageway 74. The engaging member 96 comprises a material which is expandable in the radial direction into the annular recess 98. The annular recess 98 receives the expanded engaging member 96 when the valve portion 72 is being connected or disconnected from the locking portion 100, as will be described below.

The sealing means 94 and the engaging member 96 are in a spaced apart coaxial relationship. The engaging member 96 is adjacent the second end 90 while the sealing means 94 is between the engaging member 94 and the first end 73. The engaging member 96 is preferably made of a somewhat flexible or resilient material which is expandable in the radial direction when subjected to pressure or force and yet maintains its original shape upon release of the pressure or force. In a preferred embodiment the engaging member 96 comprises a substantially circular split metal ring 96 having a first end 96A adjacent a second end 96B, as shown in FIG. 1B.

In the embodiment shown the quick connect sealing valve means 70 further comprises the locking portion 100 having a first end 102 and a second end 104 which is in a spaced apart relationship from the first end 102. The second end 104 is coaxially and operatively connected to a hose 118. In preferred embodiments the first end 102 can have a sloped end surface 103 to aid in placement of the locking portion 100 into the passageway 74 in the valve portion 72.

The locking portion 100 generally defines a passageway 106 extending therethrough which is in communication with the passageway 74. In a preferred embodiment, the passageway 106 is in coaxial alignment with the passageway 74 in the valve portion 72. The locking portion 100 further defines a locking means 108 on an exterior surface 101 of the locking portion 100. In preferred embodiments the locking means 108 comprises a detent or cam surface circumferentially extending around the locking portion 100. In other embodiments, however, it is contemplated that the locking means 108 can comprise a cam surface having separate arcuate portions (not shown) or other means (not shown) for moving the engaging member 96. In the embodiment shown, the cam surface 108 has a leading side 109 and a trailing side 111. The cam surface 108 contacts the engaging member 96 when the locking portion 100 and valve portion 72 are moved into sealed engagement, as will be described in detail below.

The locking portion 100 has an unlocking means 110 which at least partially circumferentially extends around the exterior surface at the second end 104 of the locking portion 100. In the embodiment shown in FIG. 1, the unlocking means 110 has a generally U-shape having an outer sleeve 112 and a collar 114. The sleeve 112 provides a secure surface for the person disconnecting the valve means 70 to grasp or hold, as will be explained in detail below. It is also to be understood that the unlocking means 110 can comprise the collar 114 without the sleeve.

During connection of the filter assembly 10 to the fluid circulation system 8 the valve portion 72 is threadingly engaged within the passageway 50 and the second end 104 of the locking portion 100 is operatively connected to the hose 118. The first end 102 of the locking portion 100 is axially moved within the passageway 74 of the valve portion 72. The sloped surface 103 of the first end 102 passes the engaging member 96 and contacts the sealing means 94. The continued axial movement of the locking portion 100 causes the sealing means 94 to engage the exterior surface 101. As the locking portion 100 advances in a direction toward the valve portion 72 the leading side 109 of the cam surface 108 contacts the engaging member 96. The cam surface 108 forces the engaging member 96 to expand in a radial direction and to be moved into the recess 98. Continued axial movement of the locking portion 100 causes the cam surface 108 to pass at least partially beyond the recess 98 such that the engaging means 96 is at least partially displaced from the recess 98. The engaging means 96 is free to contract and thereby contact the trailing side 111 of the cam surface 108 and to again contact the outer surface 101 of the locking portion 100. The engaging means 96 contacts the outer surface 101 and retains the locking portion 100 within the passageway 74 of the valve portion 72. In certain embodiments where the valve portion 72 has a sealing means, the sealing means 94 securely engages the outer surface 101 to seal the valve portion 72 to the locking portion 100.

In order to disconnect the filter assembly 10, from the system 8, the unlocking means 110 is axially moved along the exterior surface 101 of the locking portion 100 in a direction toward the valve portion 72. In the embodiment shown in FIG. 1 the sleeve 112 is grasped and moved in a direction toward the valve portion 72. The collar 114 of the unlocking means 110 is moved into engagement with the engaging member 96. Continued axial movement of the collar 114 moves or forces the engaging member 96 to expand and to be moved into the annular recess 98. At the same time the locking portion 100 is moved in a direction away from the housing 12. In this manner the filter assembly 10 is disconnected from the system 8. Again, it should be understood that various embodiments of the quick connect/disconnect sealing valve means can be utilized in the present invention.

It is further to be understood that the interior diameters of the passageways 106 and 74 through the locking portion 100 and the valve portion 72, respectively, of the quick connect sealing valve means 70 are configured to allow for optimum flow of fluid without any detrimental pressure drop occurring during use of the filter assembly.

It is also to be understood that in certain preferred embodiments a relief valve means 120 extends within the passageway 58 in order to prevent undesired pressure drop from occurring in the use of the filter assembly. If the filter is clogged or plugged due the filtering action, the relief valve means 120 opens such that fluid which cannot pass through the filter media is able to pass through the filter assembly and back into the fluid circulation system. Unfiltered fluid passes through the fluid assembly to prevent any damage to the fluid circulation system which would be caused by an undesirable drop in fluid pressure. However, during a normal filtering operation the fluid passes through the passageways 106 and 74 in the quick connect sealing valve means 70, through the passageway 52, through the filtration media 30 and into the passageway 56, through the passageway 58 and, out through the passageway 60 to the fluid circulation system.

The outlet passageway 60 is adapted to receive a further quick connect/disconnect sealing valve means 130. Again, it is to be understood that various embodiments of the quick connect sealing valve means are useful in the outlet passageway 60. As stated above, for ease of illustration one embodiment of a detachable quick connect sealing valve means is shown in detail herein.

The quick connect/disconnect sealing valve means 130 comprises a valve portion 132 and a locking portion 170. The outlet passageway 60 is threaded to coaxially receive the threaded valve portion 132 of the quick connect sealing valve means 130. An O-ring or sealing ring 135 circumferentially engages an outer surface 131 of the valve portion 132 and seals the quick connect valve means 130 to the housing 12. The valve portion 132 has a first end 133 and a second end 150 which define at least one passageway 134. The first end 133 is threaded such that the first end 133 is threadingly engaged in the outlet passageway 60 in the housing 12. The passageway 134 defines an interior diameter (i.e., has an interior volume) such that the fluid flowing through the quick connect sealing valve means 130 does not experience a drop in pressure between passage from the passageway 58 into the passageway 134 in the housing 12.

The valve portion 132 has a support means 136 extending radially inwardly in the passageway 134 for supporting a compression spring means 138 located within the passageway 134. The compression spring 138 is operatively connected to a valve poppet or seat 140. The valve seat 140 is axially moveable between open and closed positions and is biased to a closed position by the spring 138. The valve seat 140 sealingly engages against a valve body 142 extending radially inwardly from a middle portion 143 of the valve portion 132. The compression spring 138 ensures that the valve seat 140 engages the valve body 142 in a fluid tight manner when no fluid is flowing through the passageway 134.

The second end 150 of the valve portion 132 is in a spaced apart relationship to the first end 133. The second end 150 defines an annular recess 155 which is circumferentially disposed within an interior surface 151 of the passageway 134. At least one O-ring or sealing means 154 is annularly disposed in the annular recess 155 to aid in sealing the locking portion 170 to the valve portion 132, as will be described in detail below.

The second end 150 of the valve portion 132 defines a second annular recess 158 which is circumferentially disposed within the interior surface 151 of the passageway 134. At least one engaging member 156 is annularly disposed in the annular recess 158. The engaging member 156 comprises a resilient material which is expandable in the radial direction into the annular recess 158. The annular recess 158 receives the expanded engaging member 156 when the valve portion 132 is being connected or disconnected from the locking portion 170, as will be described below.

The sealing means 154 and the engaging member 156 are in a spaced apart coaxial relationship. The engaging member 156 is adjacent the second end 150 while the sealing means 154 is between the engaging member 156 and the first end 133. The engaging member 156 is preferably made of a somewhat flexible or resilient material which can expand in a radial direction when subjected to pressure or force and yet maintain its original shape upon release of the pressure or force. In a preferred embodiment, the engaging member comprises a substantially circular split metal ring 156 having a first end adjacent a second end. In the embodiment shown, the ring 156 is substantially the same as the ring 96, as shown in FIG. 1B.

In the embodiment shown, the quick connect sealing valve means 130 further comprises the locking portion 170 having a first end 172 and a second end 174 which is in a spaced apart relationship from the first end 172. The second end 174 of the locking portion 170 is coaxially and operatively connected to a hose 188. In preferred embodiments the first end 172 can have a sloped end surface 173 to aid in placement of the locking portion 170 into the passageway 134 in the valve portion 132.

The locking portion 170 generally defines a passageway 176 extending therethrough which is in communication with the passageway 134. In a preferred embodiment, the passageway 176 is in coaxial alignment with the passageway 134 of the valve portion 132. The locking portion 170 further defines a locking means 178 on an exterior surface 171 of the locking portion 170. In preferred embodiments, the locking means 178 comprises a detent or cam surface circumferentially extending around the locking portion 170. In other embodiments, however, it is contemplated that the locking means 178 can comprise a cam surface having separate arcuate portions (not shown) or other means (not shown) for moving the engaging member 156. In the embodiment shown, the cam surface 178 has a leading side 179 and a trailing side 181. The cam surface 178 contacts the engaging member 156 when the locking portion 170 and valve portion 132 are moved into sealed engagement, as will be described in detail below.

The locking portion 170 has an unlocking means 180 which at least partially circumferentially extends around the exterior surface of at least a portion of the second end 174 of the locking portion 170. In the embodiment shown in FIG. 1, the unlocking means 180 has a generally U-shape having an outer sleeve 182 and a collar 184. The sleeve 182 provides a secure surface for the person disconnecting the valve means 130 to grasp or hold, as will be explained in detail below. It is also to be understood that the unlocking means 180 can comprise the collar 184 without the sleeve.

During connection of the filter assembly 10 to the fluid circulation system 8 the valve portion 132 is threadingly engaged within the passageway 60 and the second end 174 of the locking portion 170 is operatively connected to the hose 188. The first end 172 of the locking portion 170 is axially moved within the passageway 134 of the valve portion 132. The sloped surface 173 of the first end 172 passes the engaging member 156 and contacts the sealing means 154. The continued axial movement of the locking portion 170 causes the sealing means 154 to engage the exterior surface 171 of the locking portion 170. As the locking portion 170 advances in a direction toward the valve portion 132, the leading side 179 of the cam surface 178 contacts the engaging means 156. The cam surface 178 forces the engaging member 156 to expand in a radial direction and to be moved into the recess 158. Continued movement of the first end 172 causes the cam surface 178 to pass at least partially beyond the recess 158 such that the engaging means 156 is at least partially displaced from the recess 158. The engaging means 156 is free to contact the trailing side 181 of the cam surface 178 and to again contact the outer surface 171 of the locking portion 170. The engaging means 156 engages the outer surface 171 and retains the locking portion 170 within the passageway 134 of the valve portion 132. In certain embodiments where the valve portion 132 has a sealing means 154, the sealing means 154 securely engages the outer surface 171 to seal the valve portion 132 to the locking portion 170.

In order to disconnect the filter assembly 10 from the system 8, the unlocking means 180 is axially moved along the exterior surface 171 of the locking portion 170 in a direction toward the valve portion 132. In the embodiment shown in FIG. 1, the sleeve 182 is grasped and moved toward the valve portion 132. The collar 184 of the unlocking means 180 is moved into engagement with the engaging member 156. Continued axial movement of the collar 184 moves or forces the engaging member 156 to expand and to be moved into the annular recess 158. At the same time the annular locking portion 170 is moved in a direction away from the housing 12. In this manner the filter assembly 10 is disconnected from the system 8. Again, it should be understood that various embodiments of the quick connect/disconnect sealing valve means can be utilized in the present invention.

It is further to be understood that the interior diameter of the passageways 176 and 134 through the locking portion 170 and the valve portion 132, respectively, of the quick connect sealing valve means 130 are configured to allow for optimum flow of fluid without any detrimental pressure drop occurring during use of the filter assembly.

It is to be understood that various microprocessing and fluid condition electronics can be operatively connected to the filter assembly to optimize the filter operation.

It is also appreciated that various modifications to the inventive concepts may be apparent to those skilled in the art without departing from the spirit and scope of the invention,

We claim:

1. A filter assembly comprising a filter element and a housing for supporting said filter element, the filter assembly having a first quick connect/disconnect sealing valve means operatively connected to an inlet passageway in the housing and a second quick connect/disconnect sealing valve means operatively connected to an outlet passageway in the housing wherein the filter assembly is easily connected and disconnected from a fluid circulation system;

each quick connect/disconnect sealing valve means comprising a valve portion in communication with a locking portion, the valve portion and the locking portion being axially moveable relative to each other between a connect position and a disconnect position without need to circumferentially rotate either the valve portion or the locking portion relative to one another;

the valve portion defining a passageway having a valve seat axially moveable between open and closed positions, the valve seat being biased to the closed position when no fluid is flowing through the filter assembly, the valve portion further having at least one engaging member angularly disposed with an annular recess within the passageway in the valve portion for removably engaging the locking portion; and, the locking portion comprising a locking means having a cam surface having a leading edge adjacent a trailing edge, wherein the leading edge contacts the engaging member of the valve portion when the locking portion is moved into communication with the valve portion; and, unlocking means for disengaging said engaging member to allow the locking portion to be disconnected from the valve portion.

2. The filter assembly of claim 1, wherein the locking portion defines at least one passageway which is in communication with the passageway in the valve portion, the locking portion defining said locking means on an exterior surface of the locking portion, the locking means contacting the engaging member when the locking portion and the valve portion are moved to the connect or disconnect positions.

3. The filter assembly of claim 2, wherein the locking portion comprises said unlocking said unlocking means said unlocking means being axially moveable in a direction toward the valve portion such that, when the valve portion and the locking portion are moved to the disconnect position, the unlocking means moves the engaging member into the annular recess in the passageway in the valve portion thereby allowing the locking portion to be axially removed from the valve portion.

4. The filter assembly of claim 3, wherein the valve portion comprises the valve seat adjacent a valve body, the valve seat being axially movable between the open and closed positions and being biased to the closed position against the valve body.

5. The filter assembly of claim 4, wherein one end of the locking portion is positioned within the passageway of the valve portion, wherein the passageway in the valve portion and the passageway in the locking portion are in coaxial alignment.

6. The filter assembly of claim 5, wherein the passageway in the valve portion defines an interior volume such that no drop in fluid pressure occurs when fluid passes from the passageway in the valve portion into the filter housing.

7. The filter assembly of claim 6, wherein the valve portion has a support means extending radially inwardly in the passageway, the support means being operatively connected to the valve seat.

8. The filter assembly of claim 7, wherein the support means is operatively connected to a spring means for biasing the valve seat to the closed position against the valve body.

9. The filter assembly of claim 1, wherein the engaging member comprises a material which is expandable in the radial direction in the annular recess within the annular passageway in the valve portion.

10. The filter assembly of claim 9, wherein the engaging member comprises a split metal ring having a first end adjacent a second end.

11. The filter assembly of claim 3, wherein the unlocking means comprises an angularly extending collar which contacts the engaging member when the locking portion and the valve portion are moved to the connect or disconnect positions.

12. The filter assembly of claim 11, wherein the unlocking means defines a generally U-shape having a collar and a sleeve wherein the collar contacts the engaging member when the locking portion and the valve portion are moved to the connect or disconnect positions.

* * * * *

UNITED STATES PATENT AND TRADEMARK OFFICE
CERTIFICATE OF CORRECTION

PATENT NO. : 5,611,923
DATED : March 18, 1997
INVENTOR(S) : Suri, et. al.

It is certified that error appears in the above-indentified patent and that said Letters Patent is hereby corrected as shown below:

Column 9, line 29, please delete the first "said locking".

Signed and Sealed this

Twenty-ninth Day of July, 1997

Attest:

BRUCE LEHMAN

Attesting Officer

Commissioner of Patents and Trademarks